United States Patent
Dalmiya et al.

(10) Patent No.: US 11,910,238 B2
(45) Date of Patent: Feb. 20, 2024

(54) DYNAMIC UPLINK DATA SPLIT THRESHOLD

(71) Applicant: QUALCOMM Incorporated, San Diego, CA (US)

(72) Inventors: Vishal Dalmiya, San Diego, CA (US); Vaishakh Rao, San Diego, CA (US); Sathish Kumar Nallamanti, Hyderabad (IN); Krishna Chaitanya Bellam, Hyderabad (IN); Gautham Kumar Reddy Adireddy, San Diego, CA (US); Leena Zacharias, San Jose, CA (US); Kuo-Chun Lee, San Diego, CA (US); Vanitha Aravamudhan Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 17/371,012

(22) Filed: Jul. 8, 2021

(65) Prior Publication Data

US 2023/0012050 A1    Jan. 12, 2023

(51) Int. Cl.
    H04W 28/086    (2023.01)
    H04W 28/08     (2023.01)
    H04L 1/1812    (2023.01)
    H04L 1/1867    (2023.01)

(52) U.S. Cl.
    CPC ....... H04W 28/0864 (2023.05); H04L 1/1819 (2013.01); H04L 1/1896 (2013.01); H04W 28/0942 (2020.05)

(58) Field of Classification Search
    None
    See application file for complete search history.

(56) References Cited

U.S. PATENT DOCUMENTS

| 2019/0215719 A1* | 7/2019 | Wei | H04W 28/06 |
| 2021/0076441 A1* | 3/2021 | Guha | H04W 40/20 |

FOREIGN PATENT DOCUMENTS

| WO | 2020159287 A1 | 8/2020 |
| WO | 2020204382 A1 | 10/2020 |

OTHER PUBLICATIONS

International Search Report and Written Opinion—PCT/US2022/073361—ISA/EPO—dated Oct. 7, 2022.

* cited by examiner

Primary Examiner — Saad Khawar
(74) Attorney, Agent, or Firm — Patterson & Sheridan, L.L.P.

(57) ABSTRACT

Certain aspects of the present disclosure provide techniques for dynamically determining an uplink data split threshold for communicating using one or more radio link control (RLC) entities of a split bearer configuration. A method that may be performed by a user equipment (UE) includes inputting a first set of parameters to a machine learning algorithm, obtaining, as an output of the machine learning algorithm based at least in part on the inputted first set of parameters, a value for a data split threshold, and transmitting the data using at least one of a first RLC entity or the second RLC entity based on the value for the data split threshold and the amount of data the apparatus has to transmit.

27 Claims, 9 Drawing Sheets

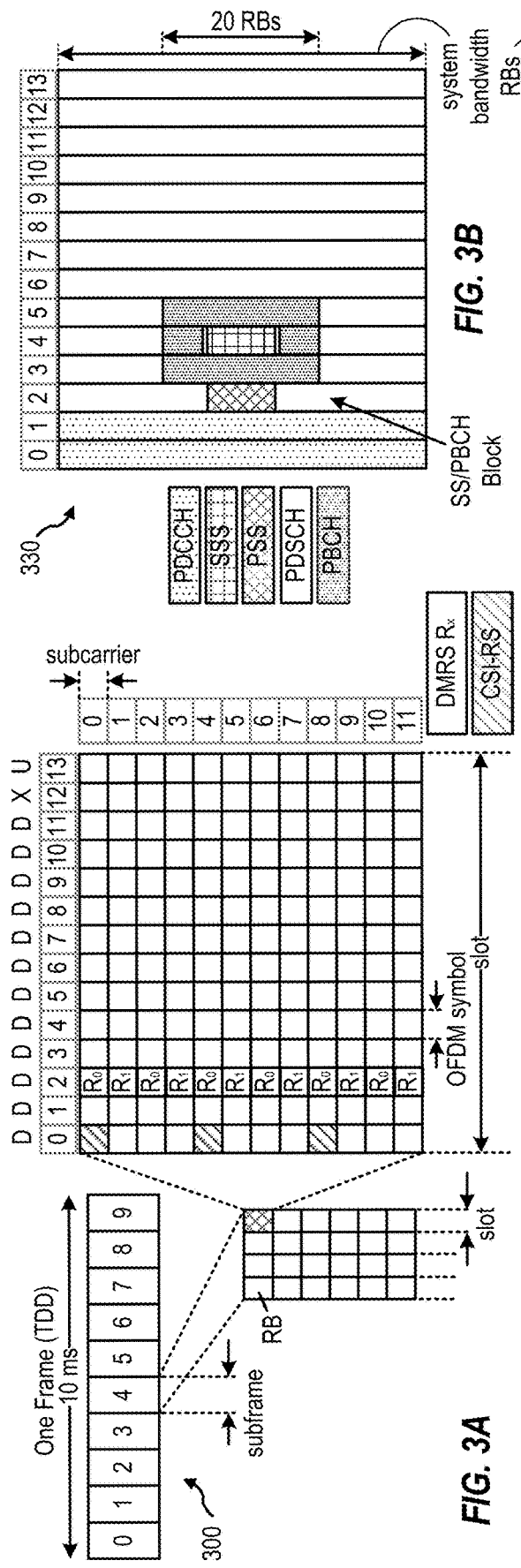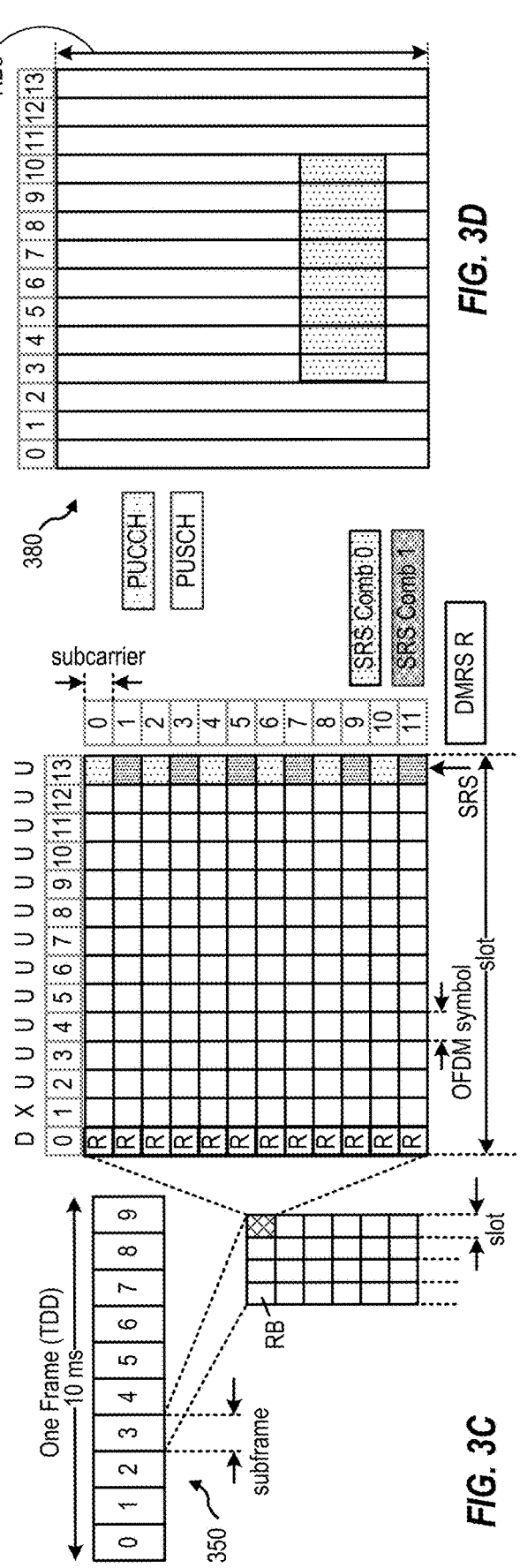

DYNAMIC UPLINK DATA SPLIT THRESHOLD

INTRODUCTION

Aspects of the present disclosure relate to wireless communications, and more particularly, to techniques for dynamically determining an uplink data split threshold for communicating using one or more radio link control (RLC) entities in a split bearer configuration.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects can be implemented in a method for wireless communication performed by an apparatus. The method generally includes inputting a first set of parameters to a machine learning algorithm. Additionally, the method may further include obtaining, as an output of the machine learning algorithm based at least in part on the inputted first set of parameters, a value for a data split threshold, wherein: when an amount of data the apparatus has to transmit is less than the data split threshold, the apparatus is configured to transmit data using a first radio link control (RLC) entity of a split-bearer configuration; and when the amount of data the apparatus has to transmit is equal to or greater than the data split threshold, the apparatus is configured to transmit the data using the first RLC entity and a second RLC entity of the split-bearer configuration. Additionally, the method may further include transmitting the data using at least one of the first RLC entity or the second RLC entity based on the value for the data split threshold and the amount of data the apparatus has to transmit.

Certain aspects can be implemented in an apparatus for wireless communication. The apparatus includes a memory and at least one processor coupled with the memory. The memory and at least one processor may be configured to: input a first set of parameters to a machine learning algorithm; obtain, as an output of the machine learning algorithm based at least in part on the inputted first set of parameters, a value for a data split threshold, wherein: when an amount of data the apparatus has to transmit is less than the data split threshold, the at least one processor is configured to transmit data using a first radio link control (RLC) entity of a split-bearer configuration; and when the amount of data the apparatus has to transmit is equal to or greater than the data split threshold, the at least one processor is configured to transmit the data using the first RLC entity and a second RLC entity of the split-bearer configuration; and transmit the data using at least one of the first RLC entity or the second RLC entity based on the value for the data split threshold and the amount of data the apparatus has to transmit.

Certain aspects can be implemented in an apparatus for wireless communication. The apparatus includes means for inputting a first set of parameters to a machine learning algorithm; means for obtaining, as an output of the machine learning algorithm based at least in part on the inputted first set of parameters, a value for a data split threshold, wherein: when an amount of data the apparatus has to transmit is less than the data split threshold, the apparatus is configured to transmit data using a first radio link control (RLC) entity of a split-bearer configuration; and when the amount of data the apparatus has to transmit is equal to or greater than the data split threshold, the apparatus is configured to transmit the data using the first RLC entity and a second RLC entity of the split-bearer configuration; and means for transmitting the data using at least one of the first RLC entity or the second RLC entity based on the value for the data split threshold and the amount of data the apparatus has to transmit.

Certain aspects can be implemented in a non-transitory computer-readable medium for wireless communication. The non-transitory computer-readable medium comprises executable instructions that, when executed by one or more processors of an apparatus, cause the apparatus to: input a first set of parameters to a machine learning algorithm; obtain, as an output of the machine learning algorithm based at least in part on the inputted first set of parameters, a value for a data split threshold, wherein: when an amount of data the apparatus has to transmit is less than the data split threshold, the apparatus is configured to transmit data using a first radio link control (RLC) entity of a split-bearer configuration; and when the amount of data the apparatus has to transmit is equal to or greater than the data split threshold, the apparatus is configured to transmit the data using the first RLC entity and a second RLC entity of the split-bearer configuration; and transmit the data using at least one of the first RLC entity or the second RLC entity based on the value for the data split threshold and the amount of data the apparatus has to transmit.

Certain aspects can be implemented in a computer program product for wireless communication. The computer program product may be embodied on a computer-readable storage medium and may comprise code for inputting a first set of parameters to a machine learning algorithm; obtaining, as an output of the machine learning algorithm based at least in part on the inputted first set of parameters, a value for a data split threshold, wherein: when an amount of data the apparatus has to transmit is less than the data split threshold, the apparatus is configured to transmit data using a first radio link control (RLC) entity of a split-bearer configuration; and when the amount of data the apparatus has to transmit is equal to or greater than the data split threshold, the apparatus is configured to transmit the data using the first RLC entity and a second RLC entity of the split-bearer configuration; and transmitting the data using at least one of the first RLC entity or the second RLC entity based on the value for the data split threshold and the amount of data the apparatus has to transmit.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for dynamically determining a data split threshold for communicating according to a split radio bearer configuration.

For example, in some cases, (e.g., uplink) data may be transmitted by a communication device such as a user equipment (UE) across one or more of multiple (e.g., two) radio link control (RLC) entities in a split radio bearer configuration. The multiple RLC entities may include a primary RLC entity and a secondary RLC entity. In certain aspects, when transmitting data according to the split radio bearer configuration, routing of the data on either of the primary RLC entity and/or the secondary RLC entity may be controlled based on a data split threshold. For example, in certain cases, when an amount of uplink data pending (e.g., in a UE buffer) for transmission by the UE (e.g., a number of bits of data pending for transmission) is less than the data split threshold, the uplink data may only be routed to and transmitted on the primary RLC entity while when the amount of uplink data for transmission by the UE is greater than or equal to the data split threshold, the uplink data may be routed to and transmitted on the primary RLC entity and/or the secondary RLC entity.

In many cases, the data split threshold may be statically configured by the network for a UE, such as via a serving base station of the UE. However, in certain cases, because channel conditions may change independently for each RLC entity, the statically configured data split threshold may not always be optimal and may lead to negative impacts on throughput associated with the UE and wasted resources, such as wasted time and frequency resources in the wireless communication network as well as wasted power resources at the UE. Thus, aspects of the present disclosure provide techniques to help alleviate these issues with static data split thresholds. For example, in some cases, such techniques may involve dynamically determining the data split threshold using a machine learning algorithm that is intended to at least improve throughput at the UE based on one or more input parameters. Stated otherwise, a machine learning algorithm may be used to form a prediction regarding a data split threshold for increasing a downlink or uplink throughput of the UE. In addition to increasing throughput of the UE, dynamically determining the data split threshold may avoid wastage of resources, unnecessary end-to-end transmission delay, and unnecessary power consumption.

Introduction to Wireless Communication Networks

Figure 1:
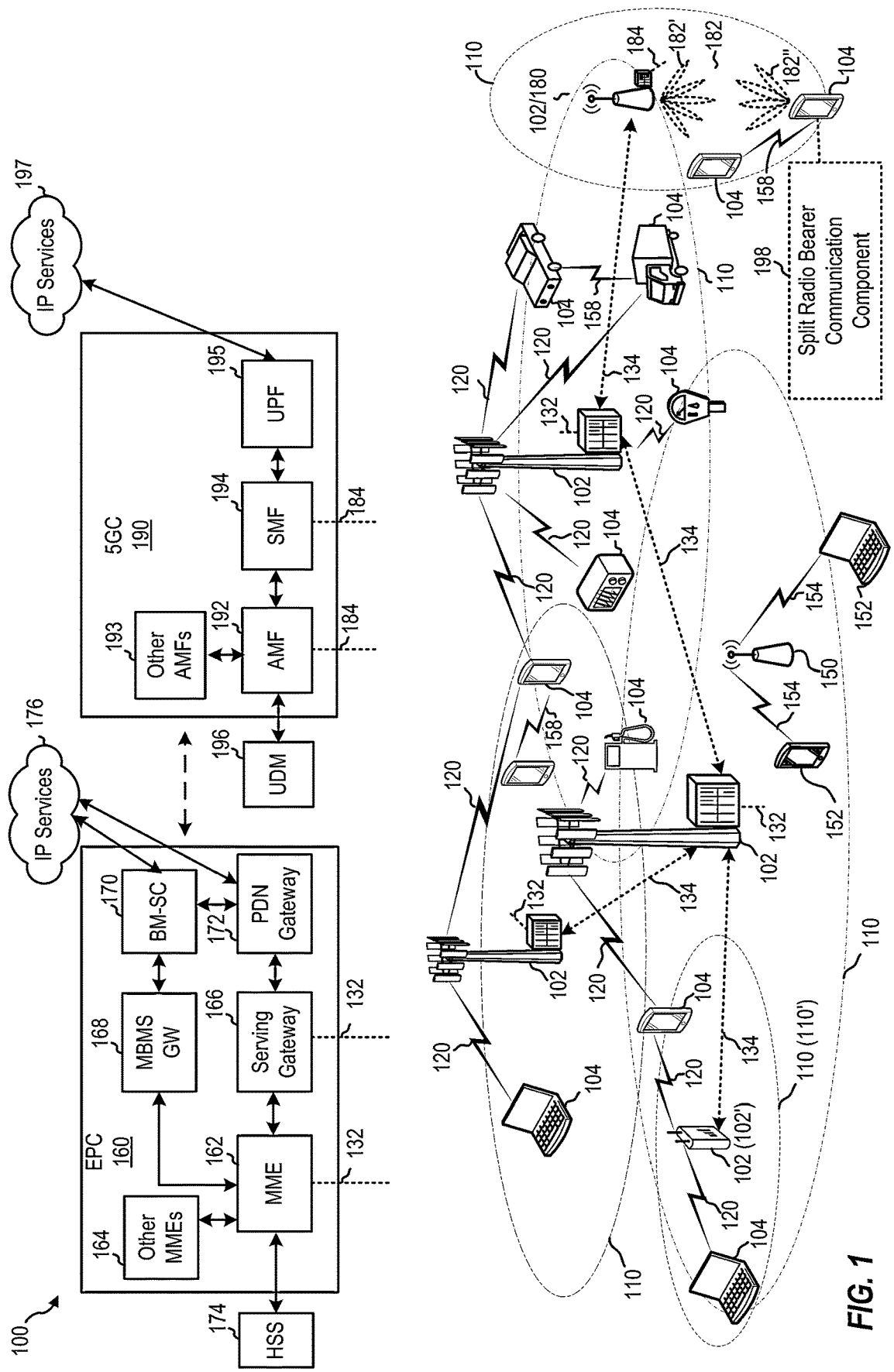
FIG. 1 is a block diagram conceptually illustrating an example wireless communication network.

FIG. 1 depicts an example of a wireless communications network 100, in which aspects described herein may be implemented.

Generally, wireless communications network 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 7:
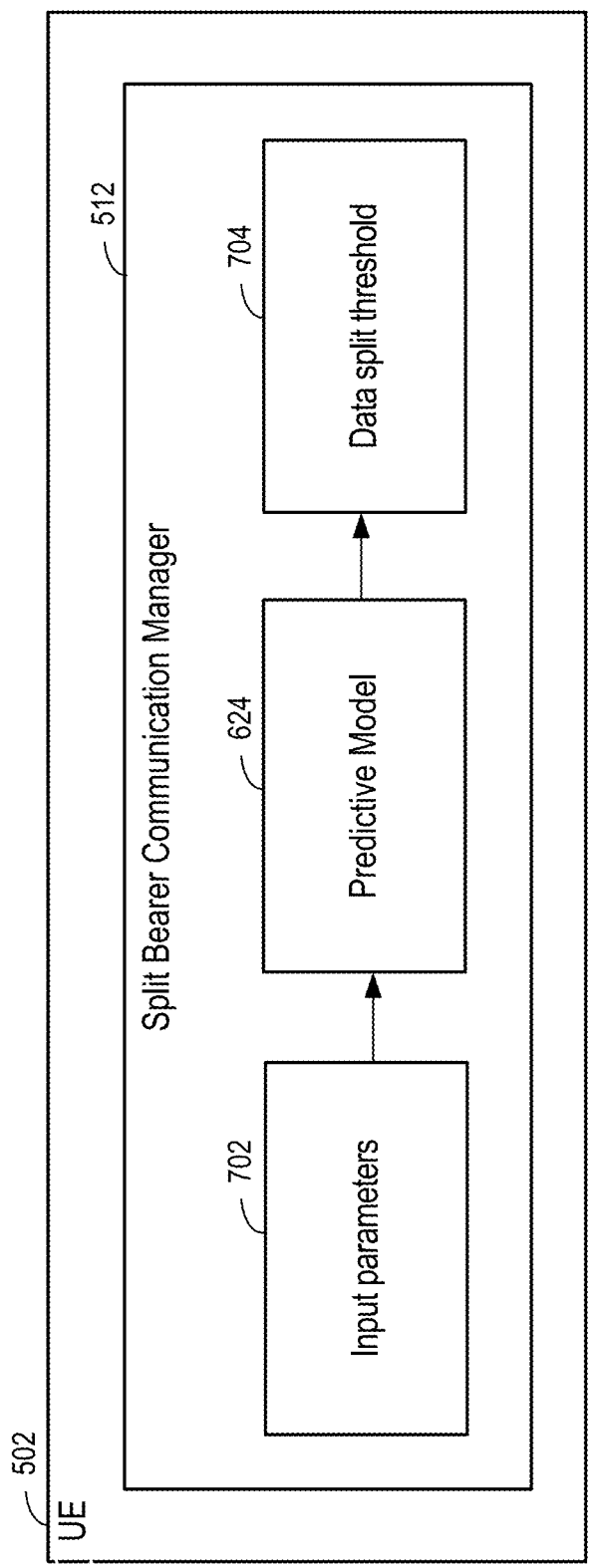
FIG. 7 provides a flow diagram illustrating the dynamic determination of a data split threshold in a user equipment.
Figure 8:
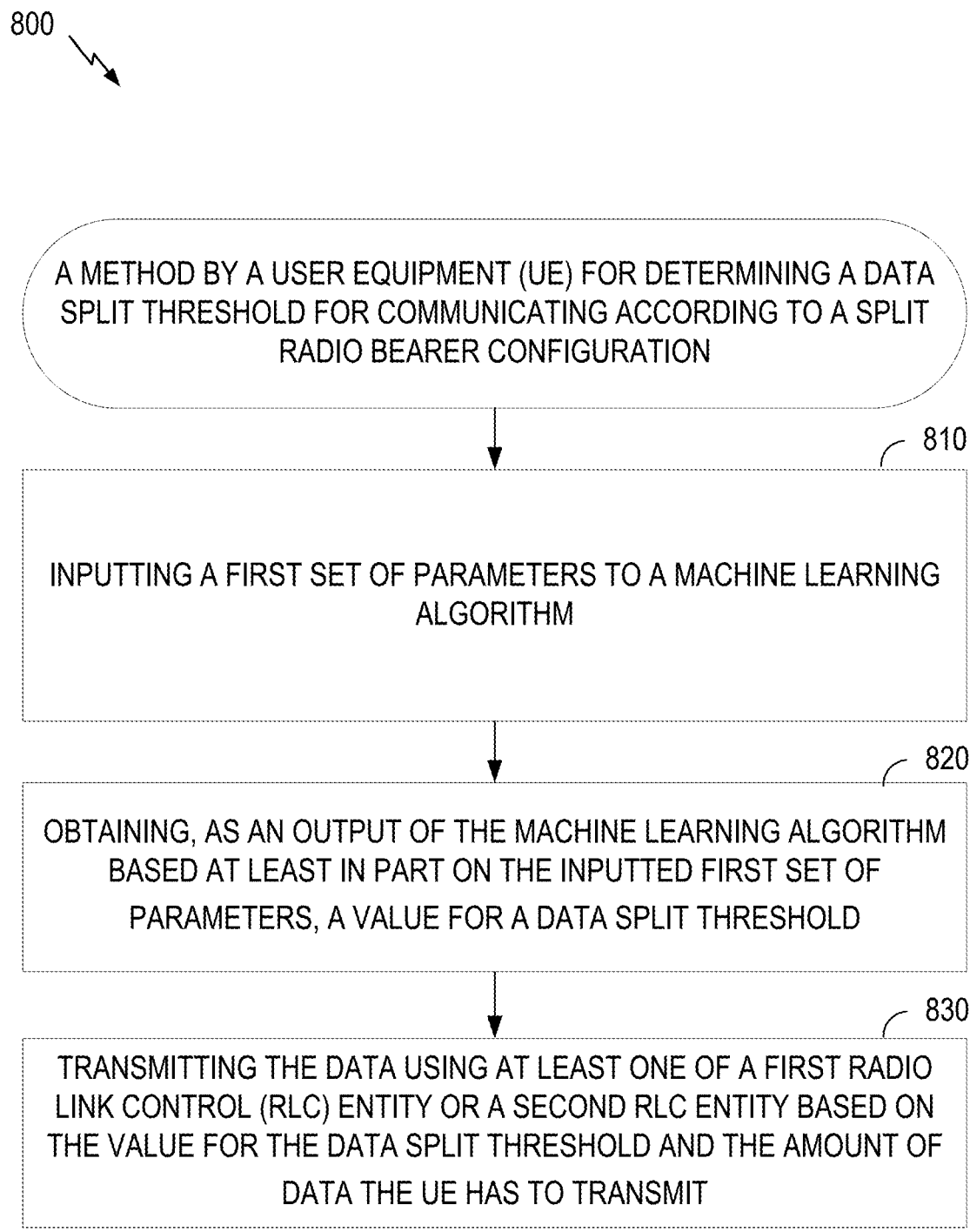
FIG. 8 is a flow diagram illustrating example operations for wireless communication by a user equipment.

As shown, the UE 104 includes a split radio bearer communication component 198, which may be configured to perform the operations in FIGS. 7-8 as well as other operations described herein for determining a data split threshold for communicating according to a split radio bearer configuration.

Figure 2:
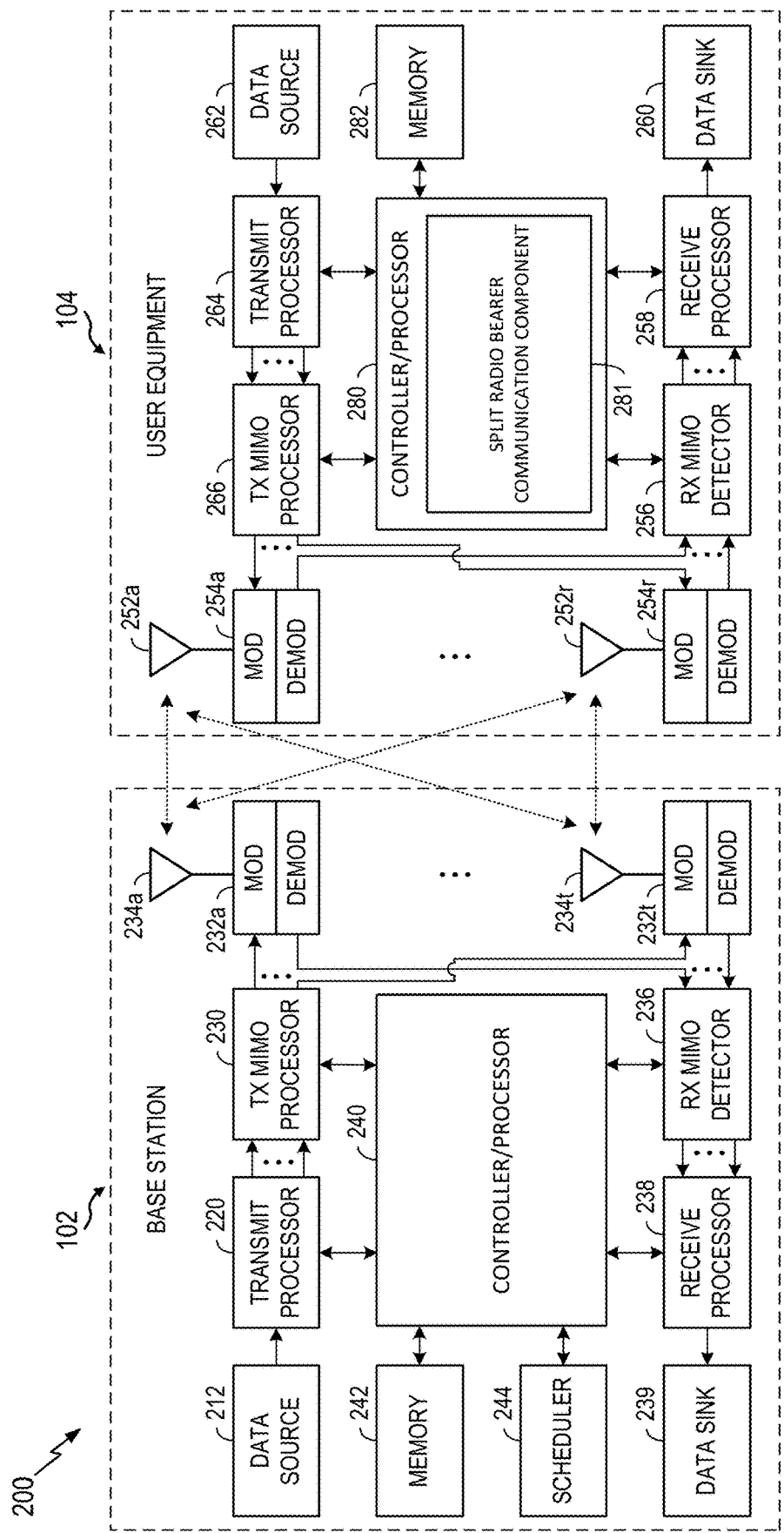
FIG. 2 is a block diagram conceptually illustrating aspects of an example of a base station and a user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes split radio bearer communication component 281, which may be representative of split radio bearer communication component 198 of FIG. 1. Notably, while depicted as an aspect of controller/processor 280, split radio bearer communication component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to Dual Connectivity Architectures

With 5G New Radio (NR) deployments aggressively moving ahead globally, concurrent RAT (CRAT) solutions comprise of a combination of 5G+4G/3G/2G RATs. There are two 5G architecture solutions defined by Rel15 3GPP standards: a non-standalone (NSA) 5G architecture and standalone (SA) 5G architecture. In the standalone 5G NR architecture, both signaling network and radio may be handled by 5G Core. In contrast, in the 5G NSA architecture, a long term evolution (LTE) core network and LTE radio access may be used as an anchor for all signaling and mobility management while adding a new 5G Carrier. This architecture is attractive for early deployments of 5G NR access systems as networks may reuse the legacy operational LTE eNodeB (eNB) and evolved packet core (EPC). Non-standalone solutions are also attractive as they facilitate a seamless migration from 4G to 5G for networks leveraging existing LTE core network.

Dual Connectivity (DC) has been introduced to allow a UE to simultaneously connect to two different network points for achieving higher throughput, reliability and mobility robustness. Evolved Universal Mobile Telecommunications Service Terrestrial Radio Access Network (EU-TRAN)-NR Dual Connectivity (EN-DC) is one form of dual connectivity using LTE and NR. In EN-DC mode and for a non-standalone implementation, the UE may be connected to an LTE eNB and to NR gNB. In certain cases, the LTE eNB may act as a master node (MeNB) while the gNB may act as a secondary node (SgNB). Both nodes may interface with the Evolved packet core (EPC) in the user plane but the master node may have direct connection to EPC. Other forms of dual connectivity may also exist and are within the scope of the aspects described herein, such as next generation radio access network E-UTRA-NR dual connectivity (NGEN-DC), NR-E-UTRA dual connectivity (NE-DC), and NR-NR dual connectivity (NR-DC).

Figure 4A:
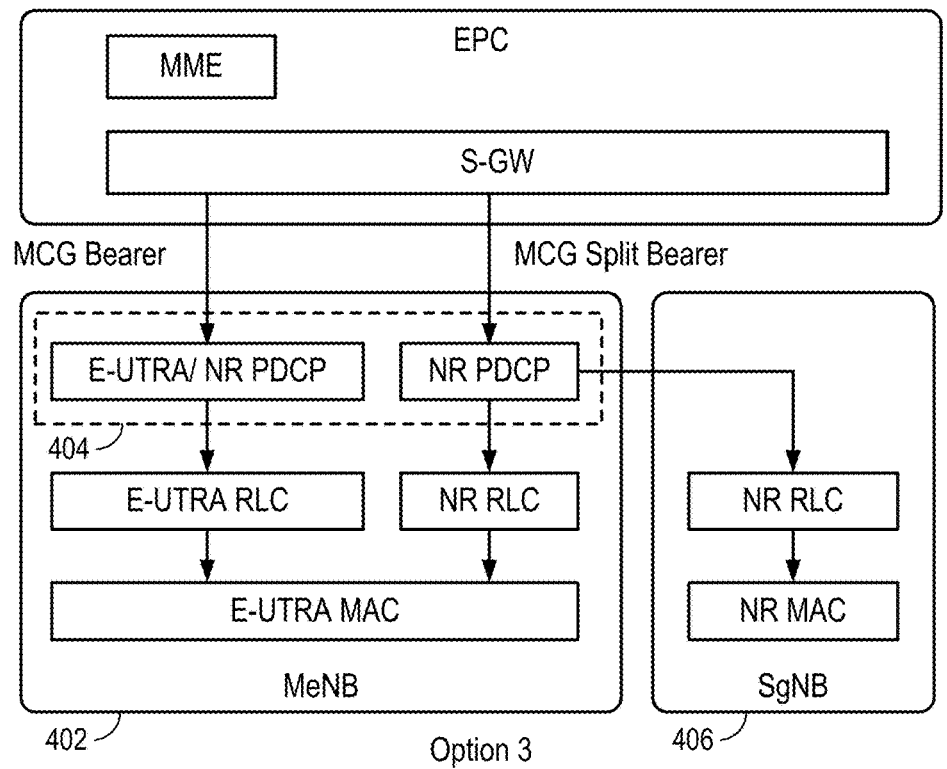
FIGS. 4A-4B illustrate different split bearer configurations, in accordance with aspects of the present disclosure.
Figure 4B:
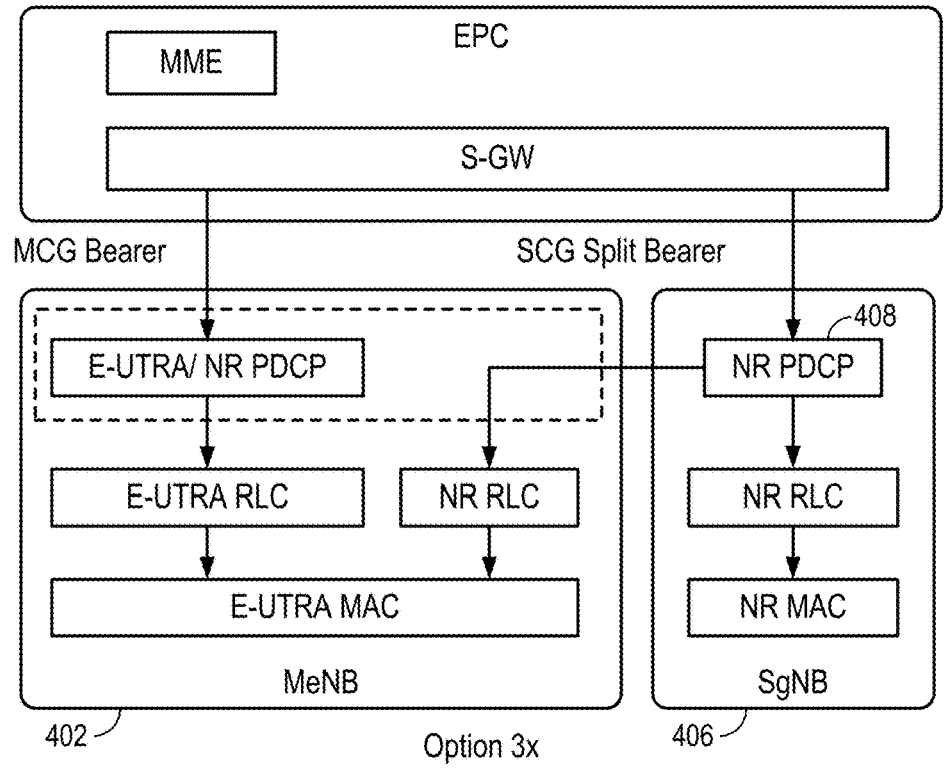

Multiple architecture options are available for dual connectivity depending on whether the system is standalone or non-standalone. In an example NSA configuration, a split bearer configuration may be used where user data is split at a packet data convergence protocol (PDCP) and routed to LTE or NR or both. Though certain aspects are described with respect to bearers that use different RATs, it should be noted that bearers that use the same RAT may similarly be used. In some cases, there may be two variants for the split bearer configuration: option 3 illustrated in FIG. 4A and option 3X illustrated in FIG. 4B. In option 3 of FIG. 4A, bearers may be terminated at MeNB 402 and user data traffic is split at the PDCP layer 404 of MeNB 402 and routed to LTE (e.g., to the MeNB 402) and NR (e.g., SgNB 406). In option 3X of FIG. 4B, bearers may be terminated at SgNB 406 and user data is split at PDCP layer 408 of SgNB 406 and routed to LTE (e.g., MeNB 402) and NR (e.g., SgNB 406). Both the options in split bearer may allow the network to leverage the bandwidth of LTE and NR to increase throughput capacity and reliability. The packet routing decision and data split ratio between LTE and 5G NR may be determined based on several factors such as channel conditions, traffic load balancing, buffer status, QOS requirements and backhaul capacity of the network.

Aspects Related to Dynamic Uplink Data Split Threshold Determination

Figure 5:
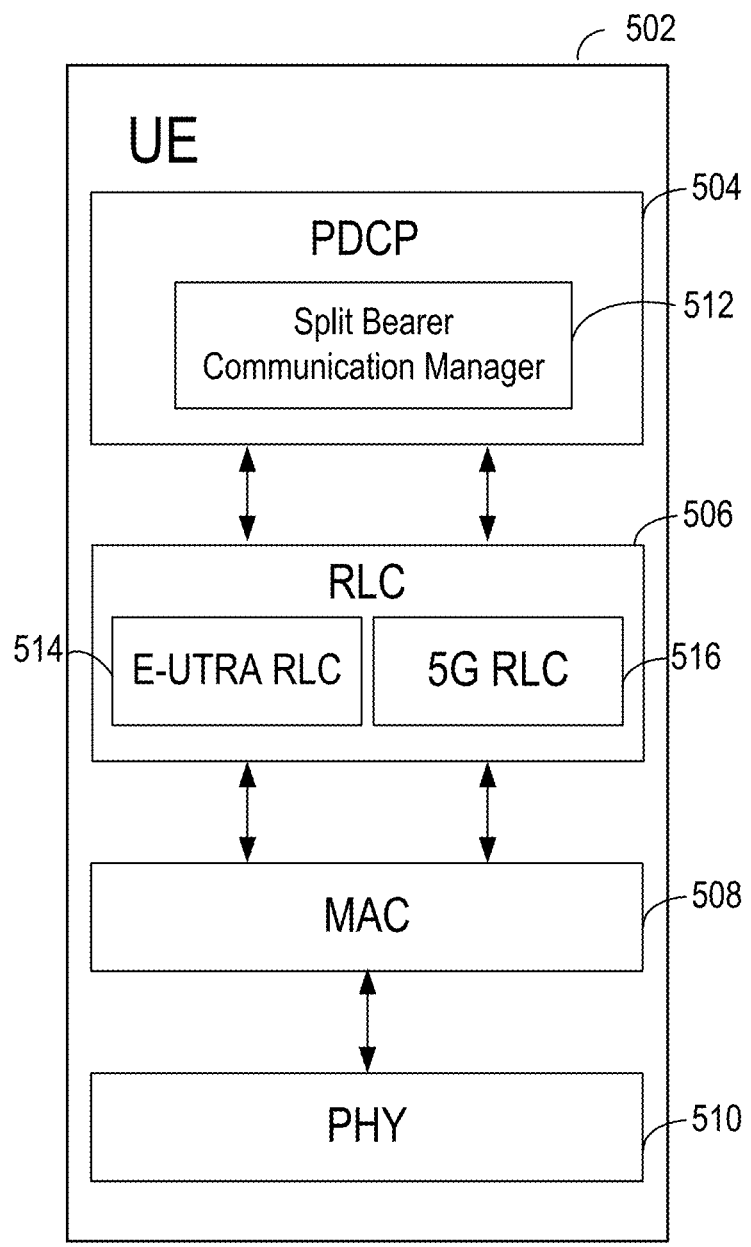
FIG. 5 illustrates an example protocol stack of a user equipment with a split radio bearer configuration.

As discussed above, in certain cases, multiple split bearer configurations may be used to support dual connectivity. Split bearer configuration may be used in other contexts as well. FIG. 5 illustrates an example protocol stack 500 of a user equipment (UE) 502 with a split bearer configuration. In some cases, the UE 502 may be an example of the UE 104 of FIG. 1. As shown, the UE 502 includes a packet data convergence protocol (PDCP) layer 504, an RLC layer 506, a media access control (MAC) layer 508, and a physical (PHY) layer 510. The PDCP layer 504 includes a split bearer communication manager 512 for routing uplink data to one or more RLC entities in the RLC layer 506, such as E-UTRAN RLC 514 and NR RLC 516. In some cases, E-UTRAN RLC 514 and NR RLC 516 may be associated with a same radio bearer or may each individually be associated with a different radio bearer used for communicating uplink data.

When transmitting uplink data from a UE with a split bearer configuration, a split bearer communication manager 512 in the PDCP layer 504 may split uplink data across two radio link control (RLC) entities in the RLC layer 506, such as a primary RLC entity (e.g., E-UTRAN RLC 514) and a secondary RLC entity (e.g., NR RLC 516), and RLC packets may be output by the RLC layer 506 on corresponding MAC entities. While the RLC entities in FIG. 5 are shown and described as E-UTRAN and NR RLC entities, it should be understood that these RLC entities may be associated with other types of networks, such as 2G or 3G networks.

The manner in which the uplink data is output to a particular RLC entity may depend on an amount of uplink data available for transmission. For example, in certain aspects, if the total amount of PDCP data volume and RLC data volume pending for initial transmission in the two associated RLC entities is equal to or larger than a data split threshold (e.g., ulDataSplitThreshold), the uplink data may be output to either the primary RLC entity or the secondary RLC entity. Otherwise, if the total amount of PDCP data volume and RLC data volume pending for initial transmission in the two associated RLC entities is less than the data split threshold, the uplink data may only be output to the primary RLC entity.

In current standards, the data split threshold (e.g., ulDataSplitThreshold) is defined as a number of bytes and may comprise one of the following values b0, b100, b200, b400, b800, b1600, b3200, b6400, b12800, b25600, b51200, b102400, b204800, b409600, b819200, b1228800, b1638400, b2457600, b3276800, b4096000, b4915200, b5734400, b6553600, or infinity.

In some cases, the data split threshold may be statically configured by the network (e.g., via a base station) when resources are configured to the UE. In certain cases, the data split threshold may not be optimal and may lead to certain negative effects. For example, assuming that the network has configured the data split threshold as 51200 (e.g., which is relatively high) the total amount of PDCP data volume may not be greater than or equal to the data split threshold. If radio conditions associated with the primary RLC entity are poor and if the primary RLC entity is receiving a low number of grants from the network or not receiving grants from the network at all, because the PDCP data volume is not greater than or equal to the data split threshold, the secondary RLC entity may not be used to transmitting uplink data (e.g., (even if the secondary RLC entity is associated with good channel conditions), which causes issues with throughput at the UE.

In another example, assuming that the network configured the data split threshold as 6400 (e.g., which is relatively low), if primary RLC entity radio conditions are poor and if data transmitted on primary RLC entity is not reaching the network while data transmitted on secondary RLC entity is reaching the network, this may create PDCP holes and end to end delay.

Thus, aspects of the present disclosure provide techniques for helping to alleviate the issues discussed above with respect to static configuration of a data split threshold. For example, in some cases, such techniques involve dynamically determining the data split threshold using a machine learning algorithm. The machine learning algorithm may be configured to generate a data split threshold that, in certain aspects, is intended to improve throughput at the UE based on one or more input parameters. Stated otherwise, a machine learning algorithm may be used to form a prediction regarding a data split threshold for increasing a downlink or uplink throughput of the UE. In addition to increasing throughput of the UE, dynamically determining the data split threshold may avoid wastage of resources, unnecessary end-to-end transmission delay, and unnecessary power consumption.

Aspects Related to Machine Learning

Machine learning may involve training a model by the UE, such as a predictive model. The model may be used to predict a data split threshold for increasing a downlink or uplink throughput of the UE. The model may be trained based on training data (e.g., training information), which may include feedback, such as feedback associated with throughput history of the UE, channel characteristics, and/or other feedback. Training may involve feedback in response to any of the predictions by the ML algorithm discussed herein or other predictions based on any of the input parameters discussed herein or other input parameters.

Figure 6:
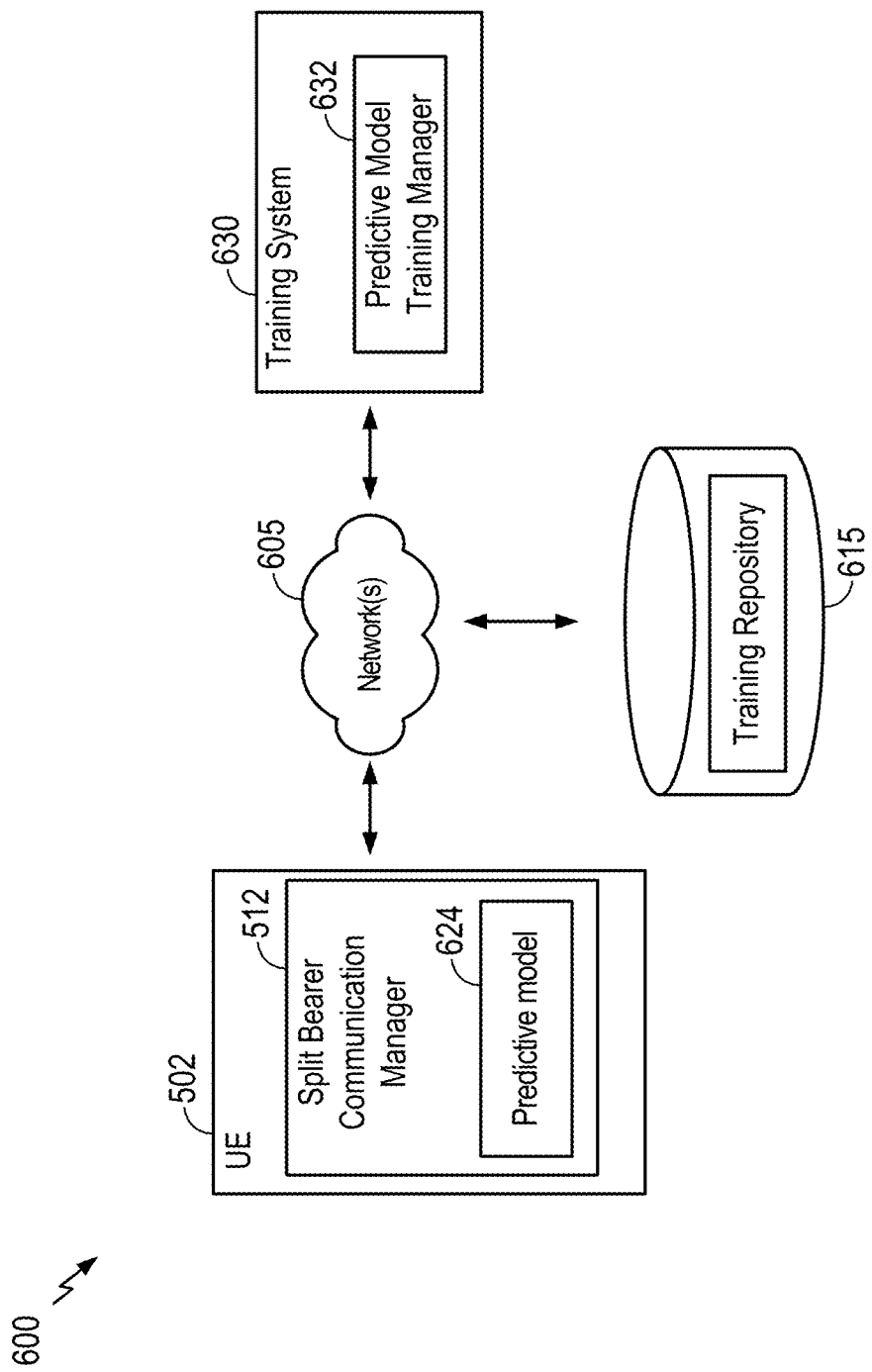
FIG. 6 illustrates an example networked environment in which a split bearer manager of a user equipment uses a predictive model for dynamic determination of a data split threshold for split bearer communication.

FIG. 6 illustrates an example networked environment 600 in which the split bearer communication manager 512 of a UE 502 uses a predictive model 624 for dynamic determination of a data split threshold for split bearer communication, according to certain aspects of the present disclosure. As shown in FIG. 6, networked environment 600 includes UE 502, a training system 630, and a training repository 615, communicatively connected via network(s) 605. Network(s) 605 may include a wireless network such as wireless communication network 100, which may be a 5G NR network, a WiFi network, an LTE network, and/or another type of network. While training system 630, UE 502, and training repository 615 are illustrated as separate components in FIG. 6, training system 630, UE 502, and training repository 615 may be implemented on any number of computing systems, either as one or more standalone systems or in a distributed environment.

Training system 630 generally includes a predictive model training manager 632 that uses training data to generate predictive model 624 for predicting data split threshold for split bearer communication. Predictive model 624 may be generated based, at least in part, on the information in training repository 615.

Training repository 615 may include training data obtained before and/or after deployment of UE 502. UE 502 may be trained in a simulated communication environment (e.g., in field testing, drive testing) prior to deployment of UE 502. For example, various buffer history information can be stored to obtain training information related to the estimates, predictions, etc.

This information can be stored in training repository 615. After deployment, training repository 615 can be updated to include feedback associated with data split thresholds used by UE 502 for split bearer communication. The training repository can also be updated with information from other BSs and/or other UEs, for example, based on learned experience by those BSs and UEs, which may be associated with packet buffering performed by those BSs and/or UEs.

Predictive model training manager 632 may use the information in training repository 615 to determine predictive model 624 (e.g., algorithm) used for dynamic data split threshold determination for split bearer communication. Predictive model training manager 632 may use various different types of machine learning algorithms to form predictive model 624. Training system 630 may be located on UE 502, on a BS in the network 605, or on a different entity that determines predictive model 624. If located on a different entity, then predictive model 624 is provided to UE 502. Training repository 615 may be a storage device, such as a memory. Training repository 615 may be located on UE 502, training system 630, or another entity in network 605. Training repository 615 may be in cloud storage. Training repository 615 may receive training information from UE 502, entities in network 605 (e.g., BSs or UEs in network 605), the cloud, or other sources.

In some cases, machine learning may use any appropriate machine learning algorithm. In some non-limiting examples, the machine learning algorithm is a supervised learning algorithm, a deep learning algorithm, an artificial neural network algorithm, or other type of machine learning algorithm.

In some examples, the machine learning (e.g., used by training system 630) is performed using a deep convolutional network (DCN). DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods. DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

In some examples, the machine learning (e.g., used by the training system 630) is performed using a neural network. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots. Individual nodes in the artificial neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation." The weight values may initially be determined by an iterative flow of training data through the network (e.g., weight values are established during a training phase in which the network learns how to identify particular classes by their typical input data characteristics).

Different types of artificial neural networks can be used to implement machine learning (e.g., used by training system 630), such as recurrent neural networks (RNNs), multilayer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. Convolutional neural networks may include collections of artificial neurons that each has a receptive field (e.g., a spatially localized region of an input space) and that collectively tile an input space. Convolutional neural networks have numerous applications. In particular, CNNs have broadly been used in the area of pattern recognition and classification. In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

In some examples, when using a machine learning algorithm, training system 630 generates vectors from the information in training repository 615. In some examples, training repository 615 stores vectors. In some examples, the vectors map one or more features to a label. For example, the features may correspond to one or more input parameters, such as an incoming data rate associated with one or more radio link control (RLC) entities, a block error ratio (BLER), and/or other factors or parameters discussed herein. The label may correspond to the predicted data split threshold value. Predictive model training manager 632 may use the vectors to train predictive model 624 for UE 502. As discussed above, the vectors may be associated with weights in the machine learning algorithm.

Using Machine Learning to Dynamically Determine an Uplink Data Split Threshold

FIG. 7 provides a flow diagram illustrating the dynamic determination of a data split threshold in a UE 502. As illustrated, the determination of the data split threshold may be performed by the split bearer communication manager 512, which, as noted above, may be included in a PDCP layer (e.g., PDCP layer 504 as illustrated in FIG. 5) and configured to output uplink data from the PDCP layer for transmission using one or more RLC entities of a split-bearer configuration within RLC layer 506, such as E-UTRAN RLC 514 and NR RLC 516, based on the data split threshold. In some cases, E-UTRAN RLC 514 may correspond to a primary or first RLC entity while NR RLC 516 may correspond to a secondary or second RLC entity or vice versa.

Whether the uplink data is output by the split bearer communication manager 512 for transmission using the first RLC entity, the second RLC entity, or both the first RLC entity and the second RLC entity may depend on the data split threshold and an amount of data that the UE 502 has to transmit. For example, when the amount of data the US 502 has to transmit is less than the data split threshold, the UE 502 may be configured to transmit the data using the first RLC entity of the split-bearer configuration. Further, when the amount of data the UE 502 has to transmit is equal to or greater than the data split threshold, the UE 502 may be configured to transmit the data using the first RLC entity and the second RLC entity of the split-bearer configuration. In other words, when the amount of data to transmit is equal to or greater than the data split threshold, the UE 502 may be permitted to transmit the data using either the first RLC entity or the second RLC entity as opposed to only being permitted to transmit the data using the first RLC entity when the amount of data to transmit is less than the data split threshold.

As shown in FIG. 7, the split bearer communication manager 512 may include a predictive model 624, which may be trained, as discussed above, to determine or predict a data split threshold 704 for split bearer communication. In some cases, the predictive model 624 may use an ML algorithm to dynamically determine the data split threshold 704 based on one or more input parameters. Further, in some cases, predictive model 624 may predict the data split threshold 704 based on a first set of parameters 702 such that a throughput associated with one or more RLC entities of the UE 502 is improved.

As shown, the split bearer communication manager 512 may be configured to input the first set of parameters 702 into a machine learning algorithm of the predictive model 624. Thereafter, the split bearer communication manager 512 may obtain, as an output of the machine learning algorithm of the predictive model 624 (e.g., based at least in part on the input first set of parameters 702), a value for the data split threshold 704.

After the split bearer communication manager 512 uses predictive model 624 to determine the value for the data split threshold 704, the UE 502 may apply the determined data split threshold 704 associated with the determined value. In some examples, split bearer communication manager 512 updates, replaces, and/or overrides a configured data split threshold. Thereafter, the UE 502 may transmit data using at least one of the first RLC entity or the second RLC entity based on the value for the data split threshold and the amount of data the apparatus has to transmit.

In some cases, the first set of parameters 702 may include a second value for the data split threshold configured by a base station, an incoming data rate associated with an application processor of the apparatus. I at least one of a downlink block error rate (BLER) associated with at least one of the first RLC entity or the second RLC entity or an uplink BLER associated with at least one of the first RLC entity or the second RLC entity, at least one of a downlink throughput associated with at least one of the first RLC entity or the second RLC entity or uplink throughput associated with at least one of the first RLC entity or the second RLC entity, an amount of uplink hybrid automatic repeat request (HARQ) retransmissions associated with at least one of the first RLC entity or the second RLC entity, a number of downlink packet data convergence protocol (PDCP) holes associated with at least one of the first RLC entity or the second RLC entity, one or more downlink PDCP reordering timer expiry events associated with at least one of the first RLC entity or the second RLC entity, an average delay between a new packet transmission and a radio link control (RLC) acknowledgement (e.g., HARQ delay) corresponding to the new packet transmission associated with at least one of the first RLC entity or the second RLC entity, an amount of uplink radio link control (RLC) retransmissions associated with at least one of the first RLC entity or the second RLC entity, an amount of RLC negative acknowledgements (NACKs) transmitted by the apparatus for received downlink transmissions associated with at least one of the first RLC entity or the second RLC entity, an amount of NACKs received by the apparatus for uplink transmissions by the apparatus associated with at least one of the first RLC entity or the second RLC entity, at least one of a number of packets in a transmit window associated with at least one of the first RLC entity or the second RLC entity or a number of packets in a downlink receive window associated with at least one of the first RLC entity or the second RLC entity, an amount of available memory of the apparatus, an overall central processing unit (CPU) utilization, a clock frequency of the apparatus, a numerology associated with the data transmission using at least one of the first RLC entity or the second RLC entity, at least one of a downlink or an uplink transport block (TB) size, an uplink grant size, a hybrid automatic repeat request (HARQ) round trip time (RTT), a time taken to transmit an uplink status protocol data unit (PDU), a traffic type associated with the data transmission using at least one of the first RLC entity or the second RLC entity, an average signal to noise ratio (SNR), geo-location information associated with the apparatus, carrier information associated with the data transmission using at least one of the first RLC entity or the second RLC entity, a number of active component carriers associated with the apparatus, an average packet data convergence protocol (PDCP) packet size, a time division duplex (TDD) configuration associated with at least one of the first RLC entity or the second RLC entity, thermal flow control associated with the apparatus, a frequency division duplex (FDD) configuration associated with at least one of the first RLC entity or the second RLC entity, an application profile associated with an application of the UE 502, a radio bearer mode, a single subscriber identify module (SSIM) configuration associated with the apparatus, a multiple SIM (MSIM) configuration associated with the apparatus, wherein the MSIM configuration comprises at least one of a Dual Sim Dual Standby (DSDS) configuration or a Dual Sim Dual Active (DSDA) configuration, multiple SIM (MSIM) dynamic conditions, wherein the MSIM dynamic conditions include at least one of a number of tune aways, transmit blanking, or transmit sharing, modem operating conditions associated with the apparatus, an application data protocol associated with the apparatus, a quality-of-service (QoS) profile associated with an application of the apparatus, an amount of power required to transmit the data using the first RLC entity compared to an amount of power required to transmit the data using the second RLC entity, a response time between sending a scheduling request to receiving an uplink grant corresponding to the scheduling request, or a combination thereof.

Additionally, in some cases, the first set of parameters may include historical values for the first set of parameters described above.

With respect to the parameters discussed above, as BLER increases and or SNR decreases, more time is required to transmit available packets in a buffer of the UE 502. Similarly, as HARQ delay, HARQ retransmissions, RLC retransmissions, RLC NACKs, and/or HARQ RTT increases, more time is required to transmit packets awaiting transmission. Thus, these parameters may be used by the machine learning algorithm of the predictive model 624 to determine which of the primary RCL entity (e.g., first RLC entity) or secondary RLC entity (e.g., second RLC entity) is in better shape to transmit more data for achieving higher throughput.

Additionally, the downlink and uplink throughput parameters, as well as the traffic type and QoS profile parameters, may help to determine how much of a throughput increase may be obtained by using the machine learning algorithm of the predictive model 624.

Additionally, the number of downlink PDCP holes and the one or more DL PDCP timer expiry events may infer a performance history of the system with its associated parameters during past reordering timer expiry events. These parameters may also infer channel conditions in the downlink along with the BLER. As such, these parameters may help determine how much throughput increase may be obtained by using the machine learning algorithm of the predictive model 624.

Further, a tune away time associated with the number of tune aways, the MSIM mode/configuration (e.g., DSDS and/or DSDA), and other MSIM dynamic conditions like transmit blanking and transmit sharing, provide a period of time that a UE has no radio resources to transmit the data, which affects the time for available packets to be transmitted.

Further, the geo-location and carrier information parameters may be used to train the machine learning algorithm of the predictive model 624 on data patterns related to RLC entities in an area associated with a particular carrier (e.g., network operator).

Further, the number of active component carriers, average PDCP packet size, downlink/uplink transport block size, and uplink grant size parameters may affect the amount of data that can be transmitted in uplink. Thus, the higher the value of these parameters, the larger the throughput for a given RLC entity (e.g., primary or secondary) may be. Thus, these parameters can be used to train the machine learning algorithm of the predictive model 624.

Further, the modem operating conditions, such as thermal conditions, battery consumption, overall CPU utilization, clock frequency, numerology and/or other modem conditions, may influence a capability and/or effectiveness of a modem of the UE of how quickly data may be processed and transmitted. Thus, these modem operating conditions may be used to train the machine learning algorithm of the predictive model 624 to predict the data split threshold as well as which RLC entity should be the primary or secondary RLC entity, as described below.

As noted above, in some cases, split bearer communication manager 512 may be configured to dynamically determine the data split threshold based on a trigger event. In other words, in response to detecting a trigger event, the split bearer communication manager may be configured to input the first set of parameters 702 into the machine learning algorithm of the predictive model 624 to obtain the data split threshold 704. In some cases, the trigger event may include at least one of a measured throughput associated with the first RLC entity being less than a threshold throughput associated with the first RLC entity or a measured throughput associated with the second RLC entity being less than a threshold throughput associated with the second RLC entity.

For example, as noted above, a BS may statically configure a UE (e.g., UE 502) with a data split threshold (e.g., which is different from the data split threshold 704). In some cases, this statically configured data split threshold may not be optimal and may lead to issues with throughput with one or more RLC entities of the UE, as discussed above. Accordingly, when the UE 502 detects that a throughput associated with the first RLC entity or the second RLC entity is below a respective threshold throughput, the UE 502 may determine that the configured data split threshold should be updated and may dynamically trigger the input of the first set of parameters 702 into the machine learning algorithm of the predictive model 624 to obtain the data split threshold 704.

In some cases, UE 502 may periodically determine the data split threshold. In other words, the UE 502 may periodically input the first set of parameters to the machine learning algorithm to obtain the value for the data split threshold. In such cases, the trigger event may include a timer expiration associated with the data split threshold. For example, when implementing a data split threshold, the UE 502 may start a timer associated with the data split threshold. The UE 502 may periodically determine the data split threshold upon expiration of the timer.

As noted above, the data split threshold 704 may be determined such that a throughput associated with at least one of the first RLC entity or the second RLC entity of the UE 502 is improved. However, there may be cases where the data split threshold 704 may lead to a decrease in throughput associated with at least one of the first RLC entity or the second RLC entity of the UE 502. For example, in some cases, the UE 502 may detect a decrease in throughput (e.g., by a threshold over a time period) associated with at least one of the first RLC entity or the second RLC entity when transmitting data based on the value for the data split threshold 704. In response to the detected decrease in throughput, the UE 502 may stop using the ML algorithm in the predictive model 624 to determine the data split threshold. In other words, the UE 502 may stop periodically inputting the first set of parameters to the ML algorithm to periodically obtain the value for the data split threshold. In some cases, when the UE 502 detects the decrease in throughput, the UE may use a configured data split threshold received from the base station instead of the value for the data split threshold that lead to the detected decrease in throughput.

In some cases, the split bearer communication manager 512 may also be able to dynamically determine a priority between the first RLC entity and the second RLC entity of the UE 502. Such priority may specify which RLC entity of a split bearer configuration of the UE 502 (e.g., the first RLC entity or second RLC entity) should be the primary RLC entity and which RLC entity should be a secondary RLC entity. For example, this may be helpful in situations where the data split threshold is set relatively high and where channel conditions associated with a current primary RLC entity are poor while channel conditions associated with a current secondary RLC entity are good. In such cases, an amount of data for transmission may not exceed the threshold because the data split threshold is set relatively high (e.g., due to the UE receiving a lower number of granted resources or not receiving granted resources at all for the transmission caused by the poor channel conditions). Consequently, even though the channel conditions associated with the secondary RLC entity may be good, the UE 502 may not be able to use the secondary RLC entity for transmission of data because the data slit threshold has not been exceeded due to the poor channel conditions and low throughput on the primary RLC entity.

Accordingly, to help alleviate issues presented when a primary RLC entity is associated with poor channel conditions, the UE 502 may periodically and dynamically determine which RLC entity should be the primary RLC entity and which RLC entity should be the secondary RLC entity. For example, in some cases, the split bearer communication manager 512 of the UE 502 may dynamically determine that a current secondary RLC entity should be switched to the primary RLC entity and that a current primary RLC entity should be switched to the secondary RLC entity. In some cases, such determination may be based on a detection that channel conditions on the current secondary RLC entity are greater than or equal to a threshold while channel conditions on the current primary RLC entity are below the threshold.

Accordingly, for example, in some cases, split bearer communication manager 512 may be further configured to input a second set of parameters to a second machine learning algorithm within a second predictive model. In some cases, the second set of parameters may include one or more of the parameters of the first set of parameters discussed above. The split bearer communication manager 512 may then obtain, as an output of the second machine learning algorithm based at least in part on the input one or more second parameters, a priority between the first RLC entity and the second RLC entity for transmitting the data. The UE 502 may then transmit data using at least one of the first RLC entity or the second RLC entity based further on the priority.

While the techniques presented above for dynamically determining the data split threshold are described with respect to UE functions, it should be understood that these techniques may also be performed by a base station in a wireless communication network, such as the BS 102 in wireless communication network 100 illustrated in FIG. 1. For example, in some cases, the base station may also include a split bearer communication manager that may be configured to determine the data split bearer using techniques similar to that described with respect to the UE 502. For example, in some cases, the split bearer communication manager of the base station may input first set of parameters (e.g., as discussed above) to a machine learning algorithm of a predictive model and obtain, as an output of the machine learning algorithm based at least in part on the input first set of parameters, a value for a data split threshold. Thereafter, the base station may transmit signaling to the UE indicating the value for the data split threshold. The base station may then receive uplink data using at least one of a first RLC entity or a second RLC entity based on the value for the data split threshold.

Example Methods for Communicating Using a Dynamic Data Split Threshold

FIG. 8 is a flow diagram illustrating example operations 800 for wireless communication, in accordance with certain aspects of the present disclosure. The operations 800 may be performed, for example, by a UE (e.g., such as the UE 104 in the wireless communication network 100 of FIG. 1) for determining a data split threshold for communicating according to a split radio bearer configuration. The operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280, including the split radio bearer communication component 281) obtaining and/or outputting signals.

The operations 800 begin, in block 810, with inputting a first set of parameters to a machine learning algorithm.

In block 820, the UE obtains, as an output of the machine learning algorithm based at least in part on the inputted first set of parameters, a value for a data split threshold, wherein: when an amount of data the apparatus has to transmit is less than the data split threshold, the at least one processor is configured to transmit the data using a first RLC entity of a split-bearer configuration and when the amount of data the apparatus has to transmit is equal to or greater than the data split threshold, the at least one processor is configured to transmit the data using the first RLC entity and a second RLC entity of the split-bearer configuration.

In block 830, the UE transmits the data using at least one of the first RLC entity or the second RLC entity based on the value for the data split threshold and the amount of data the apparatus has to transmit.

In some cases, the value for the data split threshold obtained from the machine learning algorithm is different from a configured data split threshold received from a base station.

In some cases, inputting the first set of parameters to the machine learning algorithm in block 810 and obtaining the value for the data split threshold in block 820 may be performed by the UE in response to a trigger event. In some cases, the trigger event comprises a measured throughput associated with the first RLC entity being less than a threshold throughput associated with the first RLC entity. In some cases, the trigger event comprises a measured throughput associated with the second RLC entity being less than a threshold throughput associated with the second RLC entity. In some cases, the trigger event comprises a timer expiration.

In some cases, the operations 800 may further include detecting a decrease in throughput associated with at least one of the first RLC entity or the second RLC entity when transmitting the data based on the value for the data split threshold and in response to detecting the decrease in throughput, using a configured data split threshold received from the base station instead of the value for the data split threshold.

In some cases, the operations 800 may further include inputting one or more second parameters to a second machine learning algorithm and obtaining, as an output of the second machine learning algorithm based at least in part on the input one or more second parameters, a priority between the first RLC entity and the second RLC entity for transmitting the data. In such cases, transmitting the data using at least one of the first RLC entity or the second RLC entity in block 830 may be based further on the priority.

In some cases, the first set of parameters comprise one or more of: a second value for the data split threshold configured by a base station, an incoming data rate associated with at least one of the first RLC entity or the second RLC entity, at least one of a downlink block error rate (BLER) associated with at least one of the first radio bearer or the second radio bearer or an uplink BLER associated with at least one of the first radio bearer or the second radio bearer, at least one of a downlink throughput associated with at least one of the first radio bearer or the second radio bearer or uplink throughput associated with at least one of the first radio bearer or the second radio bearer, an amount of uplink hybrid automatic repeat request (HARD) retransmissions associated with at least one of the first radio bearer or the second radio bearer, a number of packet data convergence protocol (PDCP) holes associated with at least one of the first radio bearer or the second radio bearer, one or more PDCP reordering timer expiry events associated with at least one of the first radio bearer or the second radio bearer, an average delay between a radio link control (RLC) acknowledgement and a corresponding new packet transmission, an amount of uplink radio link control (RLC) retransmissions, an amount of negative acknowledgements (NACKs) transmitted by the apparatus for received downlink transmissions or an amount of NACKs received by the apparatus for uplink transmissions by the apparatus, at least one of a number of packets in a transmit window or a number of packets in a receive window, or an amount of available memory of the apparatus.

In some cases, the first set of parameters comprise at least two parameters. Additionally, in some cases, the first set of parameters comprise historical values for the first set of parameters.

Example Wireless Communication Devices

Figure 9:
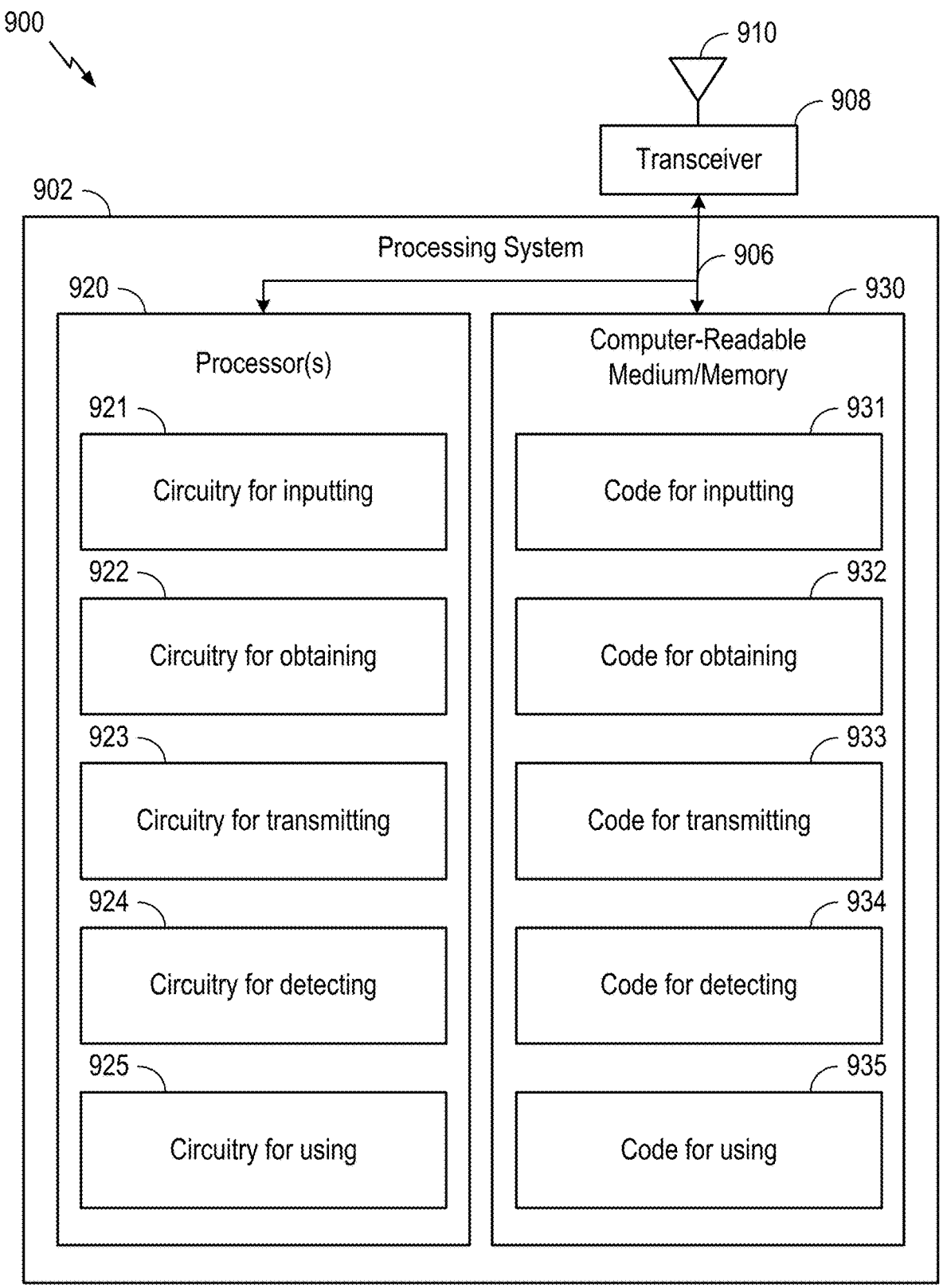
FIG. 9 depicts aspects of an example communications device.

FIG. 9 depicts an example communications device 900 that includes various components operable, configured, or adapted to perform operations for the techniques disclosed herein, such as the operations depicted and described with respect to FIGS. 7-8. In some examples, communication device 900 may be a base station 102 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIGS. 7-8, or other operations for performing the various techniques discussed herein for determining a data split threshold for communicating according to a split radio bearer configuration.

In the depicted example, computer-readable medium/memory 930 stores code 931 for inputting, code 932 for obtaining, code 933 for transmitting, code 934 for detecting, and code 935 for using.

In the depicted example, the one or more processors 920 include circuitry configured to implement the code stored in the computer-readable medium/memory 930, including circuitry 921 for inputting, circuitry 922 for obtaining, circuitry 923 for transmitting, circuitry 924 for detecting, and circuitry 925 for using.

Various components of communications device 900 may provide means for performing the methods described herein, including with respect to FIGS. 7-8.

In some examples, means for transmitting or sending (or means for outputting for transmission) may include the transceivers 232 and/or antenna(s) 234 of the base station 102 illustrated in FIG. 2 and/or transceiver 908 and antenna 910 of the communication device 900 in FIG. 9.

In some examples, means for receiving (or means for obtaining) may include the transceivers 232 and/or antenna(s) 234 of the base station illustrated in FIG. 2 and/or transceiver 908 and antenna 910 of the communication device 900 in FIG. 9.

In some examples, means for inputting, means for obtaining, means for detecting, and means for using may include various processing system components, such as: the one or more processors 920 in FIG. 9, or aspects of the user equipment 104 depicted in FIG. 2, including receive processor 258, transmit processor 264, TX MIMO processor 266, and/or controller/processor 280 (including split radio bearer communication component 281).

Notably, FIG. 9 is just one example, and many other examples and configurations of communication device 900 are possible.

Example Clauses

Implementation examples are described in the following numbered clauses:

Clause 1: A method for wireless communication by an apparatus, comprising: inputting a first set of parameters to a machine learning algorithm; obtaining, as an output of the machine learning algorithm based at least in part on the inputted first set of parameters, a value for a data split threshold, wherein: when an amount of data the apparatus has to transmit is less than the data split threshold, the apparatus is configured to transmit data using a first radio link control (RLC) entity of a split-bearer configuration; and when the amount of data the apparatus has to transmit is equal to or greater than the data split threshold, the apparatus is configured to transmit the data using the first RLC entity and a second RLC entity of the split-bearer configuration; and transmitting the data using at least one of the first RLC entity or the second RLC entity based on the value for the data split threshold and the amount of data the apparatus has to transmit.

Clause 2. The method of Clause 1, wherein the value for the data split threshold obtained from the machine learning algorithm is different from a configured data split threshold received from a base station.

Clause 3: The method of any of Clauses 1-2, wherein inputting the first set of parameters to the machine learning algorithm and obtaining the value for the data split threshold are based on a trigger event.

Clause 4: The method of Clause 3, wherein the trigger event comprises at least one of: a measured throughput associated with the first RLC entity being less than a threshold throughput associated with the first RLC entity; a measured throughput associated with the second RLC entity being less than a threshold throughput associated with the second RLC entity; or a timer expiration.

Clause 5: The method of any of Clauses 1-4, further comprising: periodically inputting the first set of parameters to the machine learning algorithm to obtain the value for the data split threshold; detecting a decrease in throughput associated with at least one of the first RLC entity or the second RLC entity when transmitting the data based on the periodically-obtained value for the data split threshold; and in response to detecting the decrease in throughput, stopping the periodically inputting of the first set of parameters to the machine learning algorithm.

Clause 6: The method of any of Clauses 1-5, further comprising: inputting one or more second parameters to a second machine learning algorithm; obtaining, as an output of the second machine learning algorithm based at least in part on the input one or more second parameters, a priority between the first RLC entity and the second RLC entity for transmitting the data; and transmitting the data using at least one of the first RLC entity or the second RLC entity based further on the priority.

Clause 7: The method of Clause 6, wherein the priority indicates: which of the first RLC entity or the second RLC entity comprises a primary RLC entity; and which of the first RLC entity or the second RLC entity comprises a secondary RLC entity.

Clause 8: The method of any of Clauses 1-7, wherein the first set of parameters comprise one or more of: a second value for the data split threshold configured by a base station, an incoming data rate associated with an application processor of the apparatus, at least one of a downlink block error rate (BLER) associated with at least one of the first RLC entity or the second RLC entity or an uplink BLER associated with at least one of the first RLC entity or the second RLC entity, at least one of a downlink throughput associated with at least one of the first RLC entity or the second RLC entity or uplink throughput associated with at least one of the first RLC entity or the second RLC entity, an amount of uplink hybrid automatic repeat request (HARQ) retransmissions associated with at least one of the first RLC entity or the second RLC entity, a number of downlink packet data convergence protocol (PDCP) holes associated with at least one of the first RLC entity or the second RLC entity, one or more downlink PDCP reordering timer expiry events associated with at least one of the first RLC entity or the second RLC entity, an average delay between a new packet transmission and a radio link control (RLC) acknowledgement corresponding to the new packet transmission associated with at least one of the first RLC entity or the second RLC entity, an amount of uplink radio link control (RLC) retransmissions associated with at least one of the first RLC entity or the second RLC entity, an amount of RLC negative acknowledgements (NACKs) transmitted by the apparatus for received downlink transmissions associated with at least one of the first RLC entity or the second RLC entity, an amount of NACKs received by the apparatus for uplink transmissions by the apparatus associated with at least one of the first RLC entity or the second RLC entity, at least one of a number of packets in a transmit window associated with at least one of the first RLC entity or the second RLC entity or a number of packets in a downlink receive window associated with at least one of the first RLC entity or the second RLC entity, an amount of available memory of the apparatus, an overall central processing unit (CPU) utilization, a clock frequency of the apparatus, a numerology associated with the data transmission using at least one of the first RLC entity or the second RLC entity, at least one of a downlink or an uplink transport block (TB) size, an uplink grant size, a hybrid automatic repeat request (HARQ) round trip time (RTT), a time taken to transmit an uplink status protocol data unit (PDU), a traffic type associated with the data transmission using at least one of the first RLC entity or the second RLC entity, an average signal to noise ratio (SNR), geo-location information associated with the apparatus, carrier information associated with the data transmission using at least one of the first RLC entity or the second RLC entity, a number of active component carriers associated with the apparatus, an average packet data convergence protocol (PDCP) packet size, a time division duplex (TDD) configuration associated with at least one of the first RLC entity or the second RLC entity, thermal flow control associated with the apparatus, a frequency division duplex (FDD) configuration associated with at least one of the first RLC entity or the second RLC entity, an application profile ass, a radio bearer mode, a single subscriber identify module (SSIM) configuration associated with the apparatus, a multiple SIM (MSIM) configuration associated with the apparatus, wherein the MSIM configuration comprises at least one of a Dual Sim Dual Standby (DSDS) configuration or a Dual Sim Dual Active (DSDA) configuration, multiple SIM (MSIM) dynamic conditions, wherein the MSIM dynamic conditions include at least one of a number of tune-aways, transmit blanking, or transmit sharing, modem operation conditions associated with the apparatus, an application data protocol associated with the apparatus, a quality-of-service (QoS)

profile associated with an application of the apparatus, an amount of power required to transmit the data using the first RLC entity compared to an amount of power required to transmit the data using the second RLC entity, a response time between sending a scheduling request to receiving an uplink grant corresponding to the scheduling request, or a combination thereof.

Clause 9: The method of Clause 8, wherein the first set of parameters comprise historical values for the first set of parameters.

Clause 10: An apparatus, comprising: a memory comprising executable instructions; one or more processors configured to execute the executable instructions and cause the apparatus to perform a method in accordance with any one of Clauses 1-9.

Clause 11: An apparatus, comprising means for performing a method in accordance with any one of Clauses 1-9.

Clause 12: A non-transitory computer-readable medium comprising executable instructions that, when executed by one or more processors of an apparatus, cause the apparatus to perform a method in accordance with any one of Clauses 1-9.

Clause 13: A computer program product embodied on a computer-readable storage medium comprising code for performing a method in accordance with any one of Clauses 1-9.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or ultra-reliable, low-latency communications (URLLC). These services, and others, may include latency and reliability requirements.

Returning to FIG. 1, various aspects of the present disclosure may be performed within the example wireless communications network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of determining a data split threshold for communicating according to a split radio bearer configuration. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:
one or more processors individually or collectively configured to execute instructions stored on one or more memories and to cause the apparatus to:
periodically input a first set of parameters to a machine learning algorithm;
periodically obtain, as an output of the machine learning algorithm based at least in part on the inputted first set of parameters, a threshold amount of data for split bearer communication, wherein:
when an amount of data the apparatus has to transmit is less than the threshold amount of data, the one or more processors are further configured to cause the apparatus to transmit data using a first radio link control (RLC) entity of a split-bearer configuration; and
when the amount of data the apparatus has to transmit is equal to or greater than the threshold amount of data, one or more processors are further configured to cause the apparatus to transmit the data using the first RLC entity and a second RLC entity of the split-bearer configuration; and
transmit the data using at least one of the first RLC entity or the second RLC entity based on the threshold amount of data and the amount of data the apparatus has to transmit;
detect a decrease in throughput associated with at least one of the first RLC entity or the second RLC entity when transmitting the data based on the periodically-obtained threshold amount of data; and
in response to detecting the decrease in throughput, stop periodically inputting the first set of parameters to the machine learning algorithm to periodically obtain the threshold amount of data.

2. The apparatus of claim 1, wherein the threshold amount of data obtained from the machine learning algorithm is different from a configured threshold amount of data received from a base station.

3. The apparatus of claim 1, wherein the one or more processors are further configured to cause the apparatus to input the first set of parameters to the machine learning algorithm and obtain the threshold amount of data in response to a trigger event.

4. The apparatus of claim 3, wherein the trigger event comprises at least one of:
a measured throughput associated with the first RLC entity being less than a threshold throughput associated with the first RLC entity;
a measured throughput associated with the second RLC entity being less than a threshold throughput associated with the second RLC entity; or
a timer expiration.

5. The apparatus of claim 1, wherein the one or more processors are further configured to cause the apparatus to:
- input one or more second parameters to a second machine learning algorithm;
- obtain, as an output of the second machine learning algorithm based at least in part on the input one or more second parameters, a priority between the first RLC entity and the second RLC entity for transmitting the data; and
- transmit the data using at least one of the first RLC entity or the second RLC entity based further on the priority.

6. The apparatus of claim 5, wherein the priority indicates:
- which of the first RLC entity or the second RLC entity comprises a primary RLC entity; and
- which of the first RLC entity or the second RLC entity comprises a secondary RLC entity.

7. The apparatus of claim 1, wherein the first set of parameters comprise one or more of:
- a second threshold amount of data configured by a base station,
- an incoming data rate associated with an application processor of the apparatus,
- at least one of a downlink block error rate (BLER) associated with at least one of the first RLC entity or the second RLC entity or an uplink BLER associated with at least one of the first RLC entity or the second RLC entity,
- at least one of a downlink throughput associated with at least one of the first RLC entity or the second RLC entity or uplink throughput associated with at least one of the first RLC entity or the second RLC entity,
- an amount of uplink hybrid automatic repeat request (HARD) retransmissions associated with at least one of the first RLC entity or the second RLC entity,
- an amount of uplink radio link control (RLC) retransmissions associated with at least one of the first RLC entity or the second RLC entity,
- an amount of RLC negative acknowledgements (NACKs) transmitted by the apparatus for received downlink transmissions associated with at least one of the first RLC entity or the second RLC entity,
- an amount of NACKs received by the apparatus for uplink transmissions by the apparatus associated with at least one of the first RLC entity or the second RLC entity.

8. The apparatus of claim 7, wherein the first set of parameters comprise one or more of:
- a number of downlink packet data convergence protocol (PDCP) holes associated with at least one of the first RLC entity or the second RLC entity,
- one or more downlink PDCP reordering timer expiry events associated with at least one of the first RLC entity or the second RLC entity,
- an average delay between a new packet transmission and a radio link control (RLC) acknowledgement corresponding to the new packet transmission associated with at least one of the first RLC entity or the second RLC entity,
- at least one of a number of packets in a transmit window associated with at least one of the first RLC entity or the second RLC entity or a number of packets in a downlink receive window associated with at least one of the first RLC entity or the second RLC entity,
- an amount of available memory of the apparatus,
- an overall central processing unit (CPU) utilization,
- a clock frequency of the apparatus,
- a numerology associated with the data transmission using at least one of the first RLC entity or the second RLC entity,
- at least one of a downlink or an uplink transport block (TB) size,
- an uplink grant size,
- a hybrid automatic repeat request (HARQ) round trip time (RTT),
- a time taken to transmit an uplink status protocol data unit (PDU),
- a traffic type associated with the data transmission using at least one of the first RLC entity or the second RLC entity,
- an average signal to noise ratio (SNR),
- geo-location information associated with the apparatus,
- carrier information associated with the data transmission using at least one of the first RLC entity or the second RLC entity,
- a number of active component carriers associated with the apparatus,
- an average packet data convergence protocol (PDCP) packet size,
- a time division duplex (TDD) configuration associated with at least one of the first RLC entity or the second RLC entity,
- thermal flow control associated with the apparatus,
- a frequency division duplex (FDD) configuration associated with at least one of the first RLC entity or the second RLC entity,
- an application profile associated with an application of the apparatus,
- a radio bearer mode,
- a single subscriber identify module (SSIM) configuration associated with the apparatus,
- a multiple SIM (MSIM) configuration associated with the apparatus, wherein the MSIM configuration comprises at least one of a Dual Sim Dual Standby (DSDS) configuration or a Dual Sim Dual Active (DSDA) configuration,
- multiple SIM (MSIM) dynamic conditions, wherein the MSIM dynamic conditions include at least one of a number of tune-aways, transmit blanking, or transmit sharing,
- modem operation conditions associated with the apparatus,
- an application data protocol associated with the apparatus,
- a quality-of-service (QoS) profile associated with an application of the apparatus,
- an amount of power required to transmit the data using the first RLC entity compared to an amount of power required to transmit the data using the second RLC entity,
- a response time between sending a scheduling request to receiving an uplink grant corresponding to the scheduling request, or
- a combination thereof.

9. The apparatus of claim 7, wherein the first set of parameters comprise historical values for the first set of parameters.

10. A method for wireless communication by an apparatus, comprising:
- periodically inputting a first set of parameters to a machine learning algorithm;
- periodically obtaining, as an output of the machine learning algorithm based at least in part on the inputted first set of parameters, a threshold amount of data, wherein:

when an amount of data the apparatus has to transmit is less than the threshold amount of data, the apparatus is configured to transmit data using a first radio link control (RLC) entity of a split-bearer configuration; and when the amount of data the apparatus has to transmit is equal to or greater than the threshold amount of data, the apparatus is configured to transmit the data using the first RLC entity and a second RLC entity of the split-bearer configuration; and transmitting the data using at least one of the first RLC entity or the second RLC entity based on the threshold amount of data and the amount of data the apparatus has to transmit;

detecting a decrease in throughput associated with at least one of the first RLC entity or the second RLC entity when transmitting the data based on the periodically-obtained threshold amount of data; and in response to detecting the decrease in throughput, stop the periodically inputting of the first set of parameters to the machine learning algorithm to periodically obtain the threshold amount of data.

11. The method of claim 10, wherein the threshold amount of data obtained from the machine learning algorithm is different from a configured threshold amount of data received from a base station.

12. The method of claim 10, wherein inputting the first set of parameters to the machine learning algorithm and obtaining the threshold amount of data are based on a trigger event.

13. The method of claim 12, wherein the trigger event comprises at least one of:
a measured throughput associated with the first RLC entity being less than a threshold throughput associated with the first RLC entity;
a measured throughput associated with the second RLC entity being less than a threshold throughput associated with the second RLC entity; or
a timer expiration.

14. The method of claim 10, further comprising:
inputting one or more second parameters to a second machine learning algorithm;
obtaining, as an output of the second machine learning algorithm based at least in part on the input one or more second parameters, a priority between the first RLC entity and the second RLC entity for transmitting the data; and
transmitting the data using at least one of the first RLC entity or the second RLC entity based further on the priority.

15. The method of claim 14, wherein the priority indicates:
which of the first RLC entity or the second RLC entity comprises a primary RLC entity; and
which of the first RLC entity or the second RLC entity comprises a secondary RLC entity.

16. The method of claim 10, wherein the first set of parameters comprise one or more of:
a second threshold amount of data configured by a base station,
an incoming data rate associated with an application processor of the apparatus,
at least one of a downlink block error rate (BLER) associated with at least one of the first RLC entity or the second RLC entity or an uplink BLER associated with at least one of the first RLC entity or the second RLC entity, at least one of a downlink throughput associated with at least one of the first RLC entity or the second RLC entity or uplink throughput associated with at least one of the first RLC entity or the second RLC entity, an amount of uplink hybrid automatic repeat request (HARD) retransmissions associated with at least one of the first RLC entity or the second RLC entity, a number of downlink packet data convergence protocol (PDCP) holes associated with at least one of the first RLC entity or the second RLC entity, one or more downlink PDCP reordering timer expiry events associated with at least one of the first RLC entity or the second RLC entity, an average delay between a new packet transmission and a radio link control (RLC) acknowledgement corresponding to the new packet transmission associated with at least one of the first RLC entity or the second RLC entity, an amount of uplink radio link control (RLC) retransmissions associated with at least one of the first RLC entity or the second RLC entity, an amount of RLC negative acknowledgements (NACKs) transmitted by the apparatus for received downlink transmissions associated with at least one of the first RLC entity or the second RLC entity, an amount of NACKs received by the apparatus for uplink transmissions by the apparatus associated with at least one of the first RLC entity or the second RLC entity, at least one of a number of packets in a transmit window associated with at least one of the first RLC entity or the second RLC entity or a number of packets in a downlink receive window associated with at least one of the first RLC entity or the second RLC entity, an amount of available memory of the apparatus, an overall central processing unit (CPU) utilization, a clock frequency of the apparatus, a numerology associated with the data transmission using at least one of the first RLC entity or the second RLC entity, at least one of a downlink or an uplink transport block (TB) size, an uplink grant size, a hybrid automatic repeat request (HARD) round trip time (RTT), a time taken to transmit an uplink status protocol data unit (PDU), a traffic type associated with the data transmission using at least one of the first RLC entity or the second RLC entity, an average signal to noise ratio (SNR), geo-location information associated with the apparatus, carrier information associated with the data transmission using at least one of the first RLC entity or the second RLC entity, a number of active component carriers associated with the apparatus, an average packet data convergence protocol (PDCP) packet size, a time division duplex (TDD) configuration associated with at least one of the first RLC entity or the second RLC entity, thermal flow control associated with the apparatus, a frequency division duplex (FDD) configuration associated with at least one of the first RLC entity or the second RLC entity, an application profile associated with an application of the apparatus, a radio bearer mode,
a single subscriber identify module (SSIM) configuration associated with the apparatus,
a multiple SIM (MSIM) configuration associated with the apparatus, wherein the MSIM configuration comprises at least one of a Dual Sim Dual Standby (DSDS) configuration or a Dual Sim Dual Active (DSDA) configuration,
multiple SIM (MSIM) dynamic conditions, wherein the MSIM dynamic conditions include at least one of a number of tune-aways, transmit blanking, or transmit sharing,
modem operation conditions associated with the apparatus,
an application data protocol associated with the apparatus,
a quality-of-service (QoS) profile associated with an application of the apparatus,
an amount of power required to transmit the data using the first RLC entity compared to an amount of power required to transmit the data using the second RLC entity,
a response time between sending a scheduling request to receiving an uplink grant corresponding to the scheduling request, or
a combination thereof.

17. The method of claim 16, wherein the first set of parameters comprise historical values for the first set of parameters.

18. An apparatus for wireless communication, comprising:
means for periodically inputting a first set of parameters to a machine learning algorithm;
means for periodically obtaining, as an output of the machine learning algorithm based at least in part on the inputted first set of parameters, a threshold amount of data, wherein:
when an amount of data the apparatus has to transmit is less than the threshold amount of data, the apparatus is configured to transmit data using a first radio link control (RLC) entity of a split-bearer configuration; and
when the amount of data the apparatus has to transmit is equal to or greater than the threshold amount of data, the apparatus is configured to transmit the data using the first RLC entity and a second RLC entity of the split-bearer configuration; and
means for transmitting the data using at least one of the first RLC entity or the second RLC entity based on the threshold amount of data and the amount of data the apparatus has to transmit;
means for detecting a decrease in throughput associated with at least one of the first RLC entity or the second RLC entity when transmitting the data based on the periodically-obtained threshold amount of data; and
means for stopping the periodically inputting of the first set of parameters to the machine learning algorithm in response to detecting the decrease in throughput.

19. The apparatus of claim 18, wherein the threshold amount of data obtained from the machine learning algorithm is different from a configured threshold amount of data received from a base station.

20. The apparatus of claim 18, wherein:
the means for inputting the first set of parameters to the machine learning algorithm include means for the first set of parameters to the machine learning algorithm based on a trigger event, and
the means for obtaining the threshold amount of data include means for obtaining the threshold amount of data based on the trigger event.

21. The apparatus of claim 20, wherein the trigger event comprises at least one of:
a measured throughput associated with the first RLC entity being less than a threshold throughput associated with the first RLC entity;
a measured throughput associated with the second RLC entity being less than a threshold throughput associated with the second RLC entity; or
a timer expiration.

22. The apparatus of claim 18, further comprising:
means for inputting one or more second parameters to a second machine learning algorithm;
means for obtaining, as an output of the second machine learning algorithm based at least in part on the input one or more second parameters, a priority between the first RLC entity and the second RLC entity for transmitting the data, wherein the priority indicates:
which of the first RLC entity or the second RLC entity comprises a primary RLC entity; and
which of the first RLC entity or the second RLC entity comprises a secondary RLC entity; and
means for transmitting the data using at least one of the first RLC entity or the second RLC entity based further on the priority.

23. The apparatus of claim 18, wherein the first set of parameters comprise one or more of:
a second threshold amount of data configured by a base station,
an incoming data rate associated with an application processor of the apparatus,
at least one of a downlink block error rate (BLER) associated with at least one of the first RLC entity or the second RLC entity or an uplink BLER associated with at least one of the first RLC entity or the second RLC entity,
at least one of a downlink throughput associated with at least one of the first RLC entity or the second RLC entity or uplink throughput associated with at least one of the first RLC entity or the second RLC entity,
an amount of uplink hybrid automatic repeat request (HARQ) retransmissions associated with at least one of the first RLC entity or the second RLC entity,
a number of downlink packet data convergence protocol (PDCP) holes associated with at least one of the first RLC entity or the second RLC entity,
one or more downlink PDCP reordering timer expiry events associated with at least one of the first RLC entity or the second RLC entity,
an average delay between a new packet transmission and a radio link control (RLC) acknowledgement corresponding to the new packet transmission associated with at least one of the first RLC entity or the second RLC entity,
an amount of uplink radio link control (RLC) retransmissions associated with at least one of the first RLC entity or the second RLC entity,
an amount of RLC negative acknowledgements (NACKs) transmitted by the apparatus for received downlink transmissions associated with at least one of the first RLC entity or the second RLC entity,
an amount of NACKs received by the apparatus for uplink transmissions by the apparatus associated with at least one of the first RLC entity or the second RLC entity, at least one of a number of packets in a transmit window associated with at least one of the first RLC entity or the second RLC entity or a number of packets in a downlink receive window associated with at least one of the first RLC entity or the second RLC entity,
an amount of available memory of the apparatus,
an overall central processing unit (CPU) utilization,
a clock frequency of the apparatus,
a numerology associated with the data transmission using at least one of the first RLC entity or the second RLC entity,
at least one of a downlink or an uplink transport block (TB) size,
an uplink grant size,
a hybrid automatic repeat request (HARD) round trip time (RTT),
a time taken to transmit an uplink status protocol data unit (PDU),
a traffic type associated with the data transmission using at least one of the first RLC entity or the second RLC entity,
an average signal to noise ratio (SNR),
geo-location information associated with the apparatus,
carrier information associated with the data transmission using at least one of the first RLC entity or the second RLC entity,
a number of active component carriers associated with the apparatus,
an average packet data convergence protocol (PDCP) packet size,
a time division duplex (TDD) configuration associated with at least one of the first RLC entity or the second RLC entity,
thermal flow control associated with the apparatus,
a frequency division duplex (FDD) configuration associated with at least one of the first RLC entity or the second RLC entity,
an application profile as associated with an application of the apparatus,
a radio bearer mode,
a single subscriber identify module (SSIM) configuration associated with the apparatus,
a multiple SIM (MSIM) configuration associated with the apparatus, wherein the MSIM configuration comprises at least one of a Dual Sim Dual Standby (DSDS) configuration or a Dual Sim Dual Active (DSDA) configuration,
multiple SIM (MSIM) dynamic conditions, wherein the MSIM dynamic conditions include at least one of a number of tune-aways, transmit blanking, or transmit sharing,
modem operation conditions associated with the apparatus,
an application data protocol associated with the apparatus,
a quality-of-service (QoS) profile associated with an application of the apparatus,
an amount of power required to transmit the data using the first RLC entity compared to an amount of power required to transmit the data using the second RLC entity,
a response time between sending a scheduling request to receiving an uplink grant corresponding to the scheduling request, or
a combination thereof.

24. The apparatus of claim 23, wherein the first set of parameters comprise historical values for the first set of parameters.

25. A non-transitory computer-readable medium comprising executable instructions that, when executed by one or more processors of an apparatus, cause the apparatus to:
periodically input a first set of parameters to a machine learning algorithm;
periodically obtain, as an output of the machine learning algorithm based at least in part on the inputted first set of parameters, a threshold amount of data, wherein:
when an amount of data the apparatus has to transmit is less than the threshold amount of data, the apparatus is configured to transmit data using a first radio link control (RLC) entity of a split-bearer configuration; and
when the amount of data the apparatus has to transmit is equal to or greater than the threshold amount of data, the apparatus is configured to transmit the data using the first RLC entity and a second RLC entity of the split-bearer configuration; and
transmit the data using at least one of the first RLC entity or the second RLC entity based on the threshold amount of data and the amount of data the apparatus has to transmit;
detect a decrease in throughput associated with at least one of the first RLC entity or the second RLC entity when transmitting the data based on the periodically-obtained threshold amount of data; and
in response to detecting the decrease in throughput, stop periodically inputting the first set of parameters to the machine learning algorithm to periodically obtain the threshold amount of data.

26. The non-transitory computer-readable medium of claim 25, wherein the value for the data split threshold obtained from the machine learning algorithm is different from a configured data split threshold received from a base station.

27. The non-transitory computer-readable medium of claim 25, wherein the first set of parameters comprise one or more of:
a second threshold amount of data configured by a base station,
an incoming data rate associated with an application processor of the apparatus,
at least one of a downlink block error rate (BLER) associated with at least one of the first RLC entity or the second RLC entity or an uplink BLER associated with at least one of the first RLC entity or the second RLC entity,
at least one of a downlink throughput associated with at least one of the first RLC entity or the second RLC entity or uplink throughput associated with at least one of the first RLC entity or the second RLC entity,
an amount of uplink hybrid automatic repeat request (HARD) retransmissions associated with at least one of the first RLC entity or the second RLC entity,
a number of downlink packet data convergence protocol (PDCP) holes associated with at least one of the first RLC entity or the second RLC entity,
one or more downlink PDCP reordering timer expiry events associated with at least one of the first RLC entity or the second RLC entity,
an average delay between a new packet transmission and a radio link control (RLC) acknowledgement corresponding to the new packet transmission associated with at least one of the first RLC entity or the second RLC entity, an amount of uplink radio link control (RLC) retransmissions associated with at least one of the first RLC entity or the second RLC entity,
an amount of RLC negative acknowledgements (NACKs) transmitted by the apparatus for received downlink transmissions associated with at least one of the first RLC entity or the second RLC entity,
an amount of NACKs received by the apparatus for uplink transmissions by the apparatus associated with at least one of the first RLC entity or the second RLC entity,
at least one of a number of packets in a transmit window associated with at least one of the first RLC entity or the second RLC entity or a number of packets in a downlink receive window associated with at least one of the first RLC entity or the second RLC entity,
an amount of available memory of the apparatus,
an overall central processing unit (CPU) utilization,
a clock frequency of the apparatus,
a numerology associated with the data transmission using at least one of the first RLC entity or the second RLC entity,
at least one of a downlink or an uplink transport block (TB) size,
an uplink grant size,
a hybrid automatic repeat request (HARQ) round trip time (RTT),
a time taken to transmit an uplink status protocol data unit (PDU),
a traffic type associated with the data transmission using at least one of the first RLC entity or the second RLC entity,
an average signal to noise ratio (SNR),
geo-location information associated with the apparatus,
carrier information associated with the data transmission using at least one of the first RLC entity or the second RLC entity,
a number of active component carriers associated with the apparatus,
an average packet data convergence protocol (PDCP) packet size,
a time division duplex (TDD) configuration associated with at least one of the first RLC entity or the second RLC entity,
thermal flow control associated with the apparatus,
a frequency division duplex (FDD) configuration associated with at least one of the first RLC entity or the second RLC entity,
an application profile associated with an application of the apparatus,
a radio bearer mode,
a single subscriber identify module (SSIM) configuration associated with the apparatus,
a multiple SIM (MSIM) configuration associated with the apparatus, wherein the MSIM configuration comprises at least one of a Dual Sim Dual Standby (DSDS) configuration or a Dual Sim Dual Active (DSDA) configuration,
multiple SIM (MSIM) dynamic conditions, wherein the MSIM dynamic conditions include at least one of a number of tune-aways, transmit blanking, or transmit sharing,
modem operation conditions associated with the apparatus,
an application data protocol associated with the apparatus,
a quality-of-service (QoS) profile associated with an application of the apparatus,
an amount of power required to transmit the data using the first RLC entity compared to an amount of power required to transmit the data using the second RLC entity,
a response time between sending a scheduling request to receiving an uplink grant corresponding to the scheduling request, or
a combination thereof.

\* \* \* \* \*